United States Patent [19]
Bebinger

[11] 3,874,714
[45] Apr. 1, 1975

[54] FITTING FOR WATER SUPPLY ARRANGEMENT

[75] Inventor: Jack E. Bebinger, Columbus, Ohio

[73] Assignee: Westinghouse Electric Corporation, Pittsburgh, Pa.

[22] Filed: Oct. 25, 1972

[21] Appl. No.: 300,617

[52] U.S. Cl. .............................. 285/354, 285/174
[51] Int. Cl. ............................................ F16l 17/00
[58] Field of Search ........................... 285/174, 354

[56] References Cited
UNITED STATES PATENTS

| 800,390 | 9/1905 | O'Meara | 285/354 X |
|---|---|---|---|
| 933,584 | 9/1909 | Rick | 285/354 X |
| 1,426,724 | 8/1922 | Fyffe | 285/354 X |
| 2,433,425 | 12/1947 | Burckle | 285/174 |
| 3,195,561 | 7/1965 | Sovitzky | 137/315 |
| 3,747,893 | 7/1973 | Long | 285/174 X |

Primary Examiner—Alfred R. Guest
Attorney, Agent, or Firm—E. C. Arenz

[57] ABSTRACT

A fitting particularly adapted for use with a dishwasher or other water supply valve of the character having a plastic body with an integral male plastic inlet end, in which the fitting includes a coupling ring of the ordinary type thread typically used with garden hoses and which may be turned onto the inlet end of the supply valve, and includes an adapter part which is internally threaded to receive a standard copper tube adapter. Thus if the dishwasher is initially sold as a convertible dishwasher, the adapter part accommodates the fitting at the end of the rubber supply hose, and then if the dishwasher is converted to a built-in, an ordinary copper tube adapter may be soldered to the end of a copper tube for a permanent connection and the fitting of the invention will accommodate the ordinary copper tube adapter. The tubular body part of the fitting has a length which is sufficiently short that a plumber or other person converting the dishwasher to a built-in installation is discouraged from attempting to grasp the tubular body part of the adapter part with a pipe wrench or the like. The tubular body has an outwardly-directed flange or shoulder at its outlet end with the periphery of the flange being of non-circular outline to facilitate using this outlet end for gripping during the operation of turning a copper tube adapter into the adapter part of the fitting.

5 Claims, 5 Drawing Figures

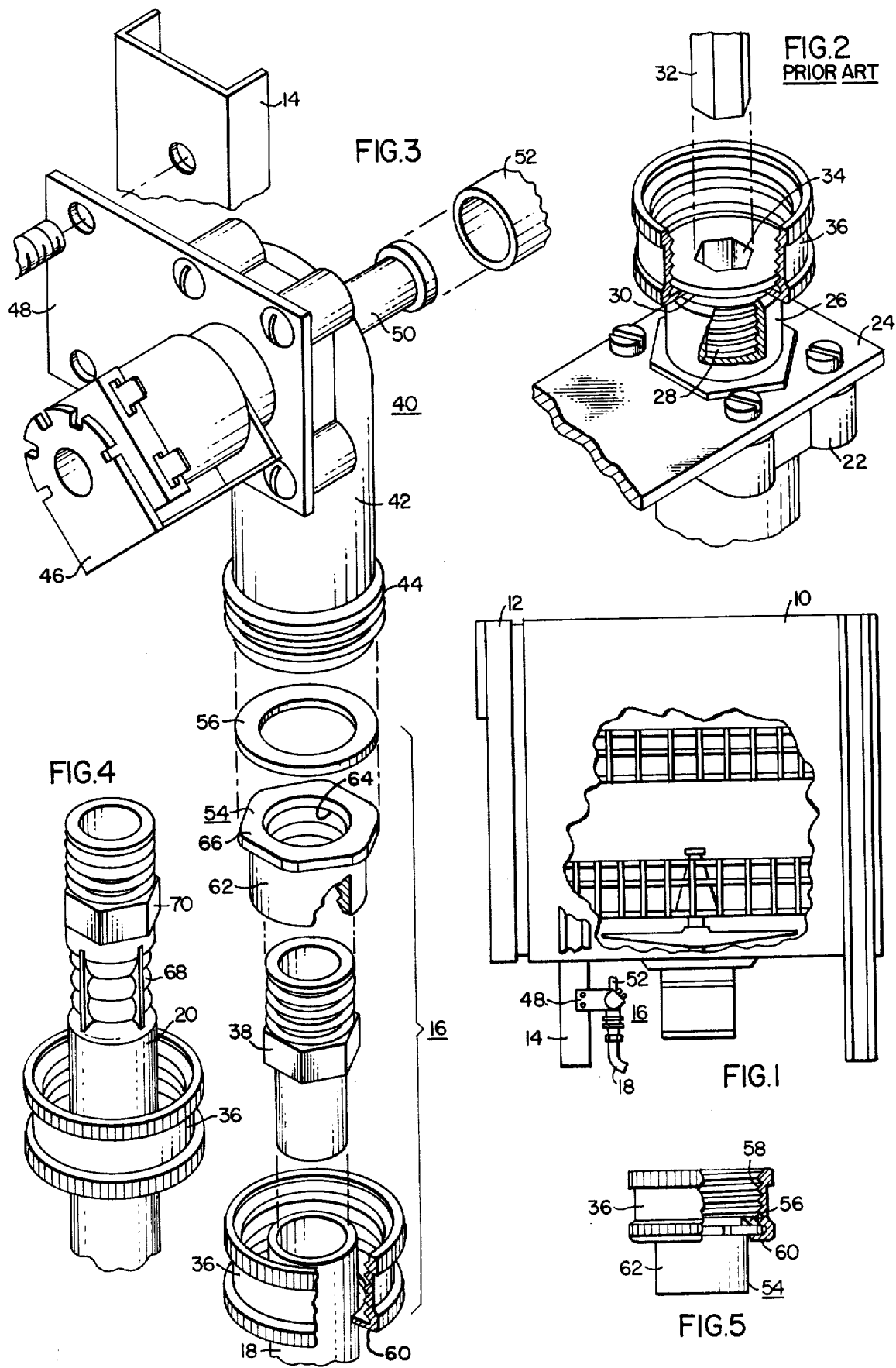

3,874,714

FITTING FOR WATER SUPPLY ARRANGEMENT

BACKGROUND OF THE INVENTION

1. Field of the Invention:

This invention relates generally to the art of water supply systems for domestic dishwashers, and in particular to fittings therefor.

2. Description of the Prior Art:

U.S. Pat. No. 3,195,561 discloses a bracket, fitting and plastic valve arrangement which is of a character which permits valves having plastic bodies to be used in undercounter dishwashers which are "plumbed in" in the sense of a relatively permanent connection being made to the water supply system through a metal pipe. This arrangement has performed satisfactorily and has been widely used, but is considered to be relatively expensive and is conventionally used with a plastic valve body which is considerably more expensive than the plastic valve body ordinarily provided for portable dishwashers.

The plastic valve body used for portable dishwashers has a male inlet end to which a coupling ring of the ordinary garden hose type is coupled in the machine, with the opposite end of the rubber hose being used connected to and disconnected from a water tap in the kitchen. It has been recognized that there is no functional reason that prevents the relatively less expensive plastic supply valve used in portable dishwashers from being used in undercounter dishwasher. However, there is a problem, to which the noted patent is directed, of avoiding the undue application of torque to the plastic threads on the supply valve when the usual plumbed-in connection is made in coupling a metal supply conduit to the valve, and the problem of avoiding undue heat being transmitted to the plastic valve body when heat is applied in coupling to the metal supply conduit.

Long, U.S. Pat. application Ser. No. 218,291 filed Jan. 17, 1972; now U.S. Pat. No. 3,747,893 is directed to a fitting arrangement which was believed to avoid the problems mentioned above in a relatively inexpensive way. However, experience has shown that one part of the fitting disclosed in that patent application is considerably more expensive to make in a satisfactory way than had been originally expected. That part is the adapter part which includes a substantial flange on the inlet end of the adapter and which tends to have problems of splitting when the adapters are made of relatively inexpensive material.

Accordingly, it is the aim of my invention to provide a fitting which may be used universally with portable, convertible, and undercounter dishwashers, which is less expensive than the proposed arrangement disclosed in the Long patent application, and which does not require special tools or unusual parts to convert a convertible dishwasher to an undercounter dishwasher with respect to the water system.

SUMMARY OF THE INVENTION

In accordance with my invention the preferred supply arrangement includes a water supply inlet valve having a plastic valve body including an integrally-molded male supply inlet, and a fitting arrangement which includes a coupling ring for coupling to the male supply inlet, an adapter part including a tubular body which is internally threaded, and has a shoulder at its end corresponding to the outlet end which abuts with an inwardly-directed flange on a coupling ring, the shoulder of the adapter part having a periphery of non-circular outline to facilitate grasping the adapter part during a holding or turning operation, and the adapter part having a length generally corresponding to the coupling ring to reduce the likelihood of a plumber or other user attempting to grasp the exterior of the tubular body of the adapter part with a pipe wrench or similar tool.

Additional details regarding the invention will be set forth in the description following:

DRAWING DESCRIPTIONS

FIG. 1 is a partly broken side view of a generally diagrammatic character of a dishwasher with the supply arrangement of the invention applied thereto;

FIG. 2 is a fragmentary isometric view of a prior art arrangement used in connection with a convertible dishwasher having a valve and supply arrangements according to the noted U.S. Pat. No. 3,195,561;

FIG. 3 is an exploded isometric view of the parts of the water system of significance in connection with the invention, and illustrating the arrangement of the parts during an operation in which the system is being converted to a permanent "plumbed-in" system;

FIG. 4 is a fragmentary perspective view of the outlet end of a rubber supply hose of the type used with the fitting according to the invention on portable and convertible dishwashers;

FIG. 5 is a half section of the fitting according to the invention.

The undercounter dishwasher of FIG. 1 includes a tub 10, a swing-down door 12 for the open front of the tub and four supporting legs 14. A convertible dishwasher being converted to undergo a permanent installation as undercounter dishwasher, will have essentially the same parts.

The parts of interest of the water supply arrangement according to the invention are generally designated 16 in FIG. 1. For a permanent installation of an undercounter dishwasher or a convertible dishwasher being permanently installed, the water supply conduit 18 is typically a copper tube which extends from the house water supply to the dishwasher. The water conduit for a portable dishwasher or a convertible dishwasher when being used as a portable is typically a rubber hose 20 (FIG. 4) provided with an end fitting similar to a female end fitting (not shown) for an ordinary garden hose which permits coupling directly to the male supply inlet of the supply valve.

In one prior art arrangement shown in FIG. 2 and which has been provided in connection with a convertible dishwasher, one of the more expensive supply valves, and a bracket and fitting of the character disclosed in the noted U.S. Pat. No. 3,195,561 is used. Only a part 22 of the supply valve is shown with the heavy plate or bracket 24 being attached to valve 22 and supporting an interiorly threaded nipple-like fitting 26 which is prevented from turning under the torque applied by being held by the plate 24. In this prior art arrangement, an exteriorly threaded adapter part 28 with a circular shoulder 30 at its inlet end is turned into the nipple-like part 26 by means of an allen wrench 32 which fits into a hexagonally shaped bore 34 in the adapter part. A coupling ring 36 is held in rotatable position on the adapter part so that with the addition of a sealing washer (not shown), a male end on the end of a rubber hose may be used to make the connection to the convertible dishwasher by turning the coupling ring to provide a water tight connection.

To convert the water supply arrangement of the prior art arrangement of FIG. 2 from the rubber hose supply to a permanent copper tube arrangement the following steps are required by the plumber. First the rubber hose is disconnected by turning the coupling ring 36. Then a ⅜ inch allen wrench 32 is inserted in the bore of the adapter part 28 and turned to remove the adapter part and the coupling ring 36 from the nipple-like part 26. The adapter part 28, and coupling ring 36 are then discarded. Since plumbers do not ordinarily have a ⅜ inch allen wrench available as part of their normal tools, this rather large allen wrench must be supplied as part of a conversion kit or the plumber is required to obtain such an allen wrench. This is considered to be a distinctly disadvantageous arrangement. Another disadvantage of this arrangement is that unless the person doing the work is aware that the adapter part 28 has the hexagonally shaped bore 34, it is very difficult to determine this because the valve is typically located in a position in which the bore shape cannot be readily seen. After removing the adapter part and coupling ring, the connection to a copper supply tube may be made using ordinary plumbing techniques by first turning a copper tube adapter 38 (FIG. 3) into the nipple-like part 26, and then soldering the copper supply tube 18 thereto. However, it will be appreciated that the adapter part 28, coupling ring 36, and typically the ⅜ inch allen wrench are discarded.

With an arrangement according to the invention, a common plastic supply valve may be used for portable, convertible, and undercounter dishwashers. This supply valve 40 may be of the type available from and designated model S-30 by the Dole Valve Company. As such, the valve body 42 is of molded plastic and includes an integrally-molded, threaded, male inlet end 44 of a diameter and thread configuration adapting an ordinary garden hose coupling ring to be connected thereto. A solenoid 46 functions to operate the valve and is connected to a metal plate 48 which in turn supports the valve and is secured to a supporting leg 14 or other structure under the dishwasher to hold the supply valve assembly 40 in place. The solenoid is operated in conventional fashion by a timer (not shown) which controls the functions of the dishwasher during the operating cycles of the dishwasher. The supply valve assembly illustrated and described has conventionally been used for portable dishwashers for some time, and is relatively inexpensive. The outlet 50 of the supply valve is connected by a rubber tube 52 leading to a water inlet opening in the walls of tub 10, as is conventional.

The improved supply arrangement according to the invention includes a connector fitting which basically comprises three parts as best seen in FIGS. 3 and 5. These parts are an adapter part 54, a coupling ring which is of the same construction as shown in FIG. 2 and accordingly carries the same identifying numeral 36, and a sealing washer 56 which is similar to an ordinary garden hose washer. The coupling ring 36 is internally threaded as at 58 and includes an inwardly-directed flange 60 at its inlet or upstream end.

The adapter part 54 has a cylindrical tubular body 62 which is interiorly threaded as at 64 for most of its length beginning at its inlet end, and has an outwardly-directed shoulder 66 at its outlet end. As is best seen in FIG. 3, this shoulder has a periphery of non-circular outline. The exterior diameter of the tubular body 62 of the adapter part is less than the inner diameter of the inwardly directed flange 60 of the coupling ring so that the adapter part is freely movable longitudinally relative to the coupling ring. The interior threads 64 of the adapter part are ⅜ inch--NPT which permits an ordinary ⅜ inch copper tube adapter 38 as shown in FIG. 3 to be connected to the adapter part. The length of the adapter part 54 is by design relatively short, such as a length which corresponds generally to the length of the coupling ring 36, so that the part of the tubular body 62 which projects upstream from the coupling ring when they are assembled together is sufficiently short that the ordinary workman is discouraged from attempting to grasp the tubular body with a wrench during any assembly or disassembly operation.

When a water supply arrangement is provided for either a portable or convertible dishwasher, the following assembly sequence occurs in the factory. As shown in FIG. 4, the rubber hose 20 used with the arrangement according to the invention is provided with a male outlet fitting 68 which is clamped onto the hose end and includes a male threaded end which is received into the tubular body 62 of the adapter part 54 by holding the hexagonal shoulder 70 while the adapter part is turned thereon by gripping its shoulder 66. Then the coupling ring 36 is shifted back onto the adapter 54 and a sealing washer 56 is placed in the coupling ring which is then turned onto the supply valve inlet 44 by hand or an appropriate tool.

When a convertible dishwasher is to be permanently plumbed in, the reverse sequence takes place to disconnect the rubber hose 20 and its end 68, which are then thrown away. The coupling ring and adapter part 54 are retained to make the connection between the copper supply tube 18 and the supply valve. When the plumber disconnects the coupling ring from the supply valve, it will be apparent to him that since the inwardly-directed flange of the coupling ring clears the adapter part as well as the end fitting 68 on the hose, the coupling ring is to be pushed down the hose which forces the sealing washer which had been used to come out of the coupling ring. This also exposes the hex shoulder 66 on the adapter part so that he can readily remove the adapter part from the hose end fitting. This also indicates to the plumber that the permanent plumbed-in connection may be readily made by using an ordinary copper adapter 38 of standard size (⅜ inch) which would be typically carried by a plumber. To accomplish this, the copper supply tube 18 is soldered to the unthreaded end of the copper tube adapter 38, then the coupling ring is slipped down past the copper tube adapter onto the copper supply tube 18 and the adapter part 54 of the fitting is turned onto the end of the copper tube adapter using one wrench to hold the shoulder on the copper tube adapter, while the other wrench holds the shoulder on the adapter part of the fitting. Then the coupling ring is slipped up until its flange abuts the shoulder of the adapter part, a sealing washer 56 (new, preferably) is inserted in the coupling ring and the coupling ring 36 is turned onto the male inlet end 44 of the supply valve.

For an undercounter dishwasher shipped from the factory, the adapter part 54, coupling ring 36, and a sealing washer 56 are provided so that the same plumbing connection just described can be made.

The arrangement is considered to be advantageous in several respects not heretofore mentioned. When the coupling ring is moved down off the adapter part to expose the hex shoulder 66, the sealing washer 56 comes out of the assembly. This removal of the washer precludes damage to the washer in the event that the soldering were to take place after the copper tube adapter is threaded into the adapter part. While this sequence is not recommended, it may be done in this way so long as the plumber does not leave the sealing washer in place during the soldering.

The adapter part 54 may be conveniently and relatively inexpensively made from standard hexagon bar stock on a screw machine. The material used may be brass of a relatively high zinc content for easier machining, but which still has a wall thickness which exceeds the minimum required to prevent damage from dezincification.

The interior diameter of the adapter part is significantly larger than the hexagonal diameter of the prior art arrangement including the adapter part 28, thus reducing the restriction to flow.

While the invention is expected to be applied normally where the supply valve is of the noted plastic character, it will be appreciated it may also be used where the valve and/or its inlet is of metal or other material.

I claim:

1. In a water supply system, the combination comprising:
   a water supply inlet valve having a plastic valve body including an integral, plastic male supply inlet for said body; and
   a fitting for making a connection between said valve inlet and a water supply conduit having an exteriorly-threaded, male outlet end, said fitting including an adapter part and a coupling ring, said coupling ring being internally threaded and provided with an inwardly-directed flange at its inlet end,
   said adapter part having a tubular body of lesser exterior diameter than the internal diameter of said inwardly-directed flange of said coupling ring, said tubular body being internally threaded at its inlet end adapting it thereby to be turned onto said supply conduit end, said adapter part having an outwardly-directed shoulder at its outlet end adapted to abut with said inwardly-directed flange of said coupling ring when said adapter part and coupling ring are assembled in generally coaxial relation with said adapter part generally projecting upstream relative to said coupling ring so that said adapter shoulder is concealed in the assembly, the periphery of said adapter shoulder being of noncircular outline to facilitate holding said adapter shoulder with a tool, and
   a removable sealing washer adapted to be received in said coupling ring and abut the downstream face of said adapter shoulder.

2. In a system according to claim 1, wherein:
   the length of said tubular body corresponds generally to the length of said coupling ring so that the part of said tubular body projecting upstream from said coupling ring is sufficiently short that it indicates to a ordinary plumber that said tubular body is not to be grasped by a wrench.

3. In a system according to claim 1 wherein:
   the exterior surface of said tubular body is of circular form.

4. In a system according to claim 1 wherein:
   said valve comprises an inlet water control valve for a dishwasher.

5. In a water supply system for a dishwasher, the combination comprising:
   an inlet water control valve including a plastic valve body having an integral plastic male supply inlet for said valve body; and
   a fitting for making a connection between said valve inlet, and a water supply conduit having an exteriorly-threaded, male outlet end, said fitting including an adapter part and a coupling ring, said coupling ring being internally threaded and provided with an inwardly-directed flange at its inlet end,
   said adapter part having a tubular body of lesser exterior diameter than the internal diameter of said inwardly-directed flange of said coupling ring, said tubular body being internally threaded at its inlet end adapting it thereby to be turned onto said supply conduit end, said adapter part having an outwardly-directed shoulder at its outlet end adapted to abut with said inwardly-directed flange of said coupling ring when said adapter part and coupling ring are assembled in generally coaxial relation with said adapter part generally projecting upstream relative to said coupling ring so that said adapter shoulder is concealed in the assembly, the periphery of said adapter shoulder being of noncircular outline to facilitate holding said adapter shoulder with a tool, the length of said tubular body corresponds generally to the length of said coupling ring so that the part of said tubular body projecting upstream from said coupling ring is sufficiently short that it indicates to an ordinary plumber that said tubular body is not to be grasped by a wrench, and
   a removable sealing washer adapted to be received in said coupling ring and abut the downstream face of said adapter shoulder.

* * * * *